United States Patent [19]

Junginger et al.

[11] 4,211,998

[45] Jul. 8, 1980

[54] METHOD OF AND REMOTE CONTROL APPARATUS FOR REMOTELY CONTROLLING A MEDICAL APPLIANCE

[75] Inventors: Klaus M. Junginger, Rastatt; Hermann Kieferle, Karlsruhe, both of Fed. Rep. of Germany

[73] Assignee: Stierlen-Maquet Aktiengesellschaft, Fed. Rep. of Germany

[21] Appl. No.: 936,060

[22] Filed: Aug. 23, 1978

[30] Foreign Application Priority Data

Aug. 25, 1977 [DE] Fed. Rep. of Germany ....... 2738406

[51] Int. Cl.$^2$ .......................... H04B 7/00; H04Q 9/12

[52] U.S. Cl. ................................ 340/171 R; 340/148

[58] Field of Search ............. 340/171 R, 171 PF, 349, 340/148; 329/109; 343/225; 325/38; 328/140

[56] References Cited

U.S. PATENT DOCUMENTS

| | | | |
|---|---|---|---|
| 3,472,965 | 10/1969 | Blossom | 340/171 R |
| 3,801,918 | 4/1974 | Milne et al. | 329/109 X |
| 4,024,502 | 5/1977 | Eberwein et al. | 340/171 PF |

*Primary Examiner*—Donald J. Yusko

*Attorney, Agent, or Firm*—Lerner, David, Littenberg & Samuel

[57] ABSTRACT

In a method of remotely controlling a medical appliance frequency signal impulses and group frequency impulses are transmitted alternately from a transmitter to a receiver.

In order to improve freedom from interference, the group frequency impulses are amplified in the transmitter and/or receiver by at least 3 dB less than the frequency signal impulses corresponding to command signals.

For the same purpose, in a remote control arrangement for performing the method, the amplifier provided in the receiver exhibits at the group frequency a gain factor lower by at least 3 dB than at the frequencies of the frequency signal impulses.

18 Claims, 6 Drawing Figures

METHOD OF AND REMOTE CONTROL APPARATUS FOR REMOTELY CONTROLLING A MEDICAL APPLIANCE

FIELD OF THE INVENTION

The invention relates to a method of remotely controlling a medical appliance by means of a preferrably mobile transmitter and of a receiver associated with at least one appliance, whereby a number, corresponding to the number of functions of the appliance to be controlled, of frequency signals of different frequency can be generated in the transmitters and as a function of a command signal corresponding to the desired function, fed into the transmitter, a frequency signal is transmitted. The invention further relates to a remote control apparatus for performing this method.

BACKGROUND OF THE INVENTION

In the past it was known to remotely control an operating table by utilizing a mobile transmitter and a receiver associated with the operating table. The transmitter uses, in accordance with the number of the functions of the operating table to be controlled, a number of feed-in keys combined to form a feed-in keyboard for feeding-in binary command signals in the 1-of-n code associated with the functions; a frequency generator having a plurality of inputs and controllable in frequency by feeding-in a code word corresponding to the relevant command signal and switchable on as a function of the appearance of a command signal; and a transmission convertor fed by the latter command signal and transmitting frequency signals corresponding to the command signals. The receiver has a reception convertor and means for selective amplification of the frequency signals received and for their reconversion into the command signals.

In this case the operation of a feed-in key causes the frequency generator, which is constructed as a free running oscillatory, to be connected to a capacitor, while the capacitors which can be connected by means of different keys exhibit different values, so that a different frequency is associated with each feed-in key. In the case of this arrangement accurate evaluation of the frequency impulses transmitted as to their duration is impossible due to the necessary building-up processes and to the echo effects which occur.

Furthermore, the arrangement is extremely susceptible to interference. But many such interference sources are to be found particularly in hospitals where remote control arrangements for medical appliances are principally used. For example, if the ultrasonic range is chosen for the transmission of the frequency signals, then interference signals may originate from ultrasonic cleaning machines for instruments, ultrasonically operated hand cleaning installations, high-frequency surgical applicances, ultrasonic diagnostic machines or ultrasonic bone welding appliances. Experience also shows that ultrasonic components occur in many resonance phenomena, e.g. in wind noises, in exhaust ducts or in telephone installations. The susceptibility to interference is particularly serious when, e.g. in a hospital with a variety of operating theatres, the respective operating tables are required to be served by means of similar remote control arrangements, because then each of these arrangements acts as an interference transmitter for at least those remote control arrangements in use in the adjacent rooms.

A remote control arrangement similar to the above type for television receiving sets is also known, wherein the frequency generator is constructed to generate a group frequency signal in addition to the frequency signals corresponding to the command signals as a function of the input group code word. The transmitter has an impulse generator which can be set in operation as a function of the appearance of a command signal. The group code word can be fed into the frequency generator instead of the code word corresponding to the relevant command signal as a function of the output impulses generated by the impulse generator. The receiver has a circuit which controls the emission of the command signals as a function of the alternating reception of a frequency signal corresponding to the command signal and of the group frequency signal. In this case therefore, during the duration of the imputing of a command signal into the transmitter by depressing an input key, the frequency signal is transmitted as a sequence of frequency signal impulses which alternate with group frequency signals of a group frequency different from all the frequency signals corresponding to command signals which can be generated, and both the frequency signal impulses and the group frequency signal impulses are amplified selectively in the receiver. The receiver also has a decoding circuit which when fed by frequency signal impulses at one time from a number of outputs corresponding to the number of the frequency signals which can be generated, emits command signal impulses, which when supplied with the group frequency signals to a further output emits indicator impulses indicating the reception of said group frequency signal impulses, and which when fed simultaneously by two signals of different frequency and approximately equal amplitude generates no output signals. The receiver further has means to emit the command signal corresponding to the respective command signal impulses as a function of the appearance of the indicator impulses, so that the emission of the command signal to the associated appliance occurs only when indicator impulses and command signal impulses are emitted alternately by the decoding circuit. The freedom from interference is already quite substantially improved in this case compared to the aforementioned known method. Nevertheless, in many cases this freedom from interference still does not fulfil the desiderata which must be imposed as to safety in the control of medical appliances. This is due to the fact that the group frequency different from the frequencies corresponding to the command signals encounters different transmission characteristics along the transmission path, so that the amplitudes of an interference radiation at the receiver may be appreciably smaller than the amplitudes of the group frequency signal impulses received and appreciably greater than the amplitudes of the frequency signal impulses received corresponding to command signals. In this case the decoding circuit of the receiver alternately generates indicator impulses and command signal impulses corresponding to the interference radiation, whereby a false control of the appliance occurs.

SUMMARY OF THE INVENTION

It is the underlying aim of the invention to disclose a method of remotely controlling a medical appliance whereby an increased freedom from interference is achieved by the transmission of a group frequency alternating with the frequency corresponding to the command signal and whereby furthermore said freedom from interference exists even when different transmission characteristics of the transmission path between transmitter and receiver occur for the frequencies corresponding to the command signals and the group frequency.

The frequency signals corresponding to command signals and the group frequency signal conveniently have their frequencies in the same technical frequency range, i.e. in known manner, in the ultrasonic range or also in the infra-red range. It is also convenient if the frequency of the group frequency signal, or in the case of a plurality of appliances controllable by means of the same remote control arrangement, the frequencies of all the group frequency signals are higher than the frequencies of all the frequency signals corresponding to command signals which can be generated. This is because, more particularly where the ultrasonic range is used, the higher frequencies are more strongly attenuated along the transmission path, which in the case of strong interference with the transmission path, e.g. by reflection. or by the incidence of interference radiations, leads, for reasons of safety, first of all to a suppression of the group frequency signals and then, as a consequence, to the interruption of the output of command signals to the associated appliance. It is also convenient to construct the transmitter so that when a command signal is fed in by depressing a feed-in key, first of all a group signal impulse, and only then, alternately, frequency signal impulses corresponding to the command signal and further group signal impulses are generated, because by this means the evaluation in the receiver is facilitated.

BRIEF DESCRIPTION OF THE DRAWINGS

A preferred embodiment of a remote control arrangement according to the invention is described more fully hereinbelow with reference to the accompanying drawing, wherein.

DETAILED DESCRIPTION OF A PREFERRED EMBODIMENT OF THE INVENTION

Figure 1:
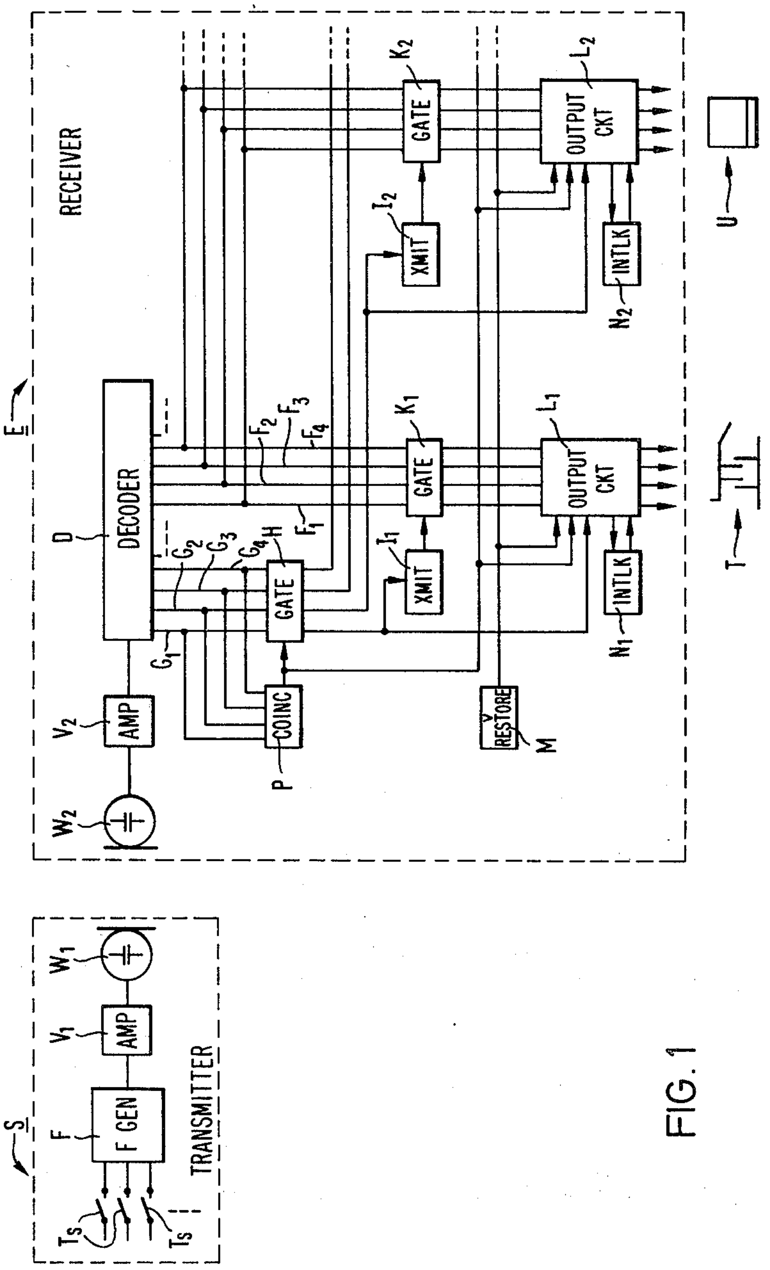
FIG. 1 shows the block circuit diagram of the remote control arrangement.

The remote control arrangement according to FIG. 1 comprises a transmitter S, which may have e.g. the form of a small box to be held in one hand with an input keyboard arranged on the top side. The input keyboard comprises a number of keys for applying the command signals, whilst a make contact TS, which may be constructed as an electronic switch, is closed in each case. By this means a transmission circuit F containing a frequency generator is set in operation, which alternately generates frequency signal impulses associated with the respective command signal and group frequency impulses. Immediately after the actuation of a key a group frequency impulse is emitted as the first such impulse. The durations of the group frequency impulses and of the frequency signal impulses are e.g. 50 ms in each case, while the end of a group frequency impulse is followed directly by a frequency signal impulse and vice versa. These impulses are amplified uniformly by means of a transmission amplifier V1, fed to a transmission converter W1 and radiated by the latter.

In the exemplary embodiment the frequencies transmitted lie in the ultrasonic range, and the transmission converter W1 is a capacitor microphone. The frequencies of the frequency signals corresponding to the command signals lie between 33.3 kHz and 39.2 kHz. The channel interval is 400 Hz at the lowest frequency and increases somewhat towards the higher frequencies. The group frequency of the transmitter S in the exemplary embodiment is 43.1 kHz.

The receiver E, which receives the signals radiated by the transmitter S, is associated with a plurality of medical appliances to be controlled. As an appliance to be controlled by means of the transmitter S illustrated, an operating table T is indicated, in which the table slab is adjustable in the vertical direction and in which the individual parts of the table slab can be pivoted with respect to one another and with respect to the base supporting them, which functions are controllable by means of the transmitter S. Furthermore, other appliances, e.g. a bed-changing appliance U, are controllable by means of further transmitters, not shown, corresponding to the transmitter S in their construction. The bed-changing appliance U is installed after the fashion of a lock in one wall of the operating theatre and exhibits a raisable and lowerable table which is transportable in the horizontal direction into the operating theatre and out of it, and around which an endless belt can be set in circulation in order to transport a patient lying on the belt, the table being stationary, relatively to the latter and at right angles to the wall. The transmitters provided for controlling the appliances T, U, . . ., including the transmitter S, differ only as regards their group frequencies, which lie in the range between 29.7 kHz and (in the case of the transmitter S illustrated) 43.1 kHz, while the frequencies of the frequency signals corresponding to command signals of all the transmitters are the same. The number of the group frequency signals which can be received by the receiver E is, therefore, as great as the number of the appliances T, U, . . . to be controlled, whereas the number of the frequency signals corresponding to command signals which can be generated in each transmitter and received by means of the receiver E is as great as the highest number of functions occurring to be controlled in an individual appliance. Where a smaller number of functions to be controlled occurs in an appliance, the associated transmitter exhibits a correspondingly smaller number of feed-in keys, and some of the frequencies which can be generated by its frequency generator are not used.

The receiver has a reception converter W2 of suitable construction for receiving signals in the ultrasonic range, an amplifier V2 following the latter and constructed as an active band pass, and a decoding circuit D fed by the output signals of the amplifier V2. At a first group of outputs G1, G2, . . . of the decoding circuit D indicator impulses are obtained when and so long as the decoding circuit D is impinged by group frequency signal impulses. If, e.g., the operating table T is controlled by means of the transmitter S illustrated, then the group frequency impulses lead to indicator impulses of equal chronological length at the output G1, whereas the different group frequency of a further transmitter, when the latter is actuated, leads to indicator impulses appearing at the output G2, etc. Correspondingly, the frequency signal impulses corresponding to command signals and fed to the decoding circuit D lead to recovered command signal impulses, therefore, represent the command signals fed into the relevant transmitter, again in the 1-of-n code.

By means of the decoding circuit D, a frequency received is tested several times within an evaluation period of, e.g., 25 ms as to whether it remains constantly within the admissible band width of a receivable frequency signal corresponding to a command signal or of a receivable group frequency signal. In the case of a positive result of the test, a corresponding command signal impulse or indicator impulse is generated at the associated output F1, F2, . . . or G1, G2, . . .; these impulses are thus staggered chronologically by the evaluation time with reference to the corresponding input frequency impulses. After the commencement of generation of the said output signals, interruptions of the reception or interference by other received frequencies do not influence the respective output signal so long as their duration remains less than 5 ms. In the case of longer lasting interference, the respective output signal disappears not less than 11 ms after the beginning of the interference. Frequencies occurring outside the useful band (frequency range of the frequency signals corresponding to command signals and group frequency signals) and, therefore, due to interference causes do not lead to a response of the decoding circuit D. However, if their amplitude is approximately as great as or greater than the amplitude of a useful frequency simultaneously impinging the decoding circuit D, then the emission is interrupted, i.e., the decoding circuit D generates no output signal (indicator impulse or command signal impulse).

The indicator impulses obtained at the outputs G1, G2 . . . are fed through a gate circuit H respectively to time-signal transmitter I1, I2, . . . The command signal impulses obtainable at the outputs F1, F2, . . . are fed through gate circuits K1,K2, . . . controlled by the associated time-signal transmitter I1, I2, . . . to one of the number, corresponding to the number of appliances T, U, . . . . A voltage restoration circuit M ensures that after the switching on of the supply voltage of the receiver M, or after the restoration of said supply voltage following a brief interruption, the emission of the command signals is omitted for a prescribed period in order to suppress any command signal which may possibly have been incorrectly generated by the voltage restoration. An interlocking circuit N1, N2, . . . , which is associated with each output circuit L1, L2, ensures that only a single command signal is emitted each time and that after the end of the command signal transmission a further command signal can be stored in the output circuit L1, L2, . . . and emitted only when a prescribed short pause time has elapsed, during which all the circuit elements can revert into their rest position.

In order that no superimposition of the command signals is possible in the case of a simultaneous actuation of two transmitters with different group frequencies associated with two different applicances T, U, . . . , the indicator impulses of the outputs G1, G2, . . . which indicate the presence of the group frequency signal impulses are fed to a coincidence circuit P which emits an output signal when two or more group frequency signals are received approximately simultaneously. The output signal of the coincidence circuit P blocks the gate circuit H, whereby the transmission of the indicator impulses to the time-signal transmitters I1, I2, . . . and hence the transmission of the command signal impulses to the output circuits L1, L2, . . . is interrupted, and further applies the output signal of the coincidence circuit P to memories contained in the output circuits L1, L2, . . . in the sense of an erasure, in order to prevent the emission of command signals which may possibly have been transmitted previously.

Figure 2:
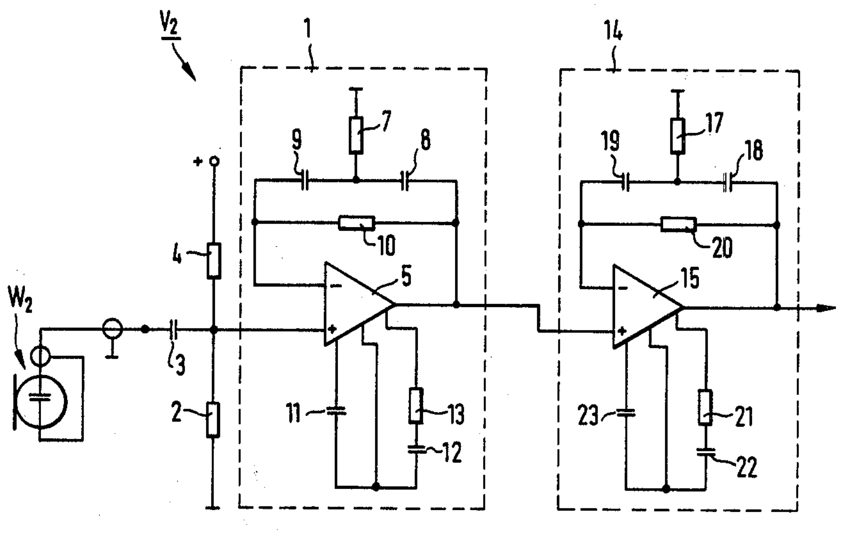
FIG. 2 shows the input amplifier of the receiver of the arrangement according to FIG. 1.

FIG. 2 shows the construction of the amplifier V2 of the receiver E (FIG. 1) in greater detail. The amplifier V2 comprises two series-connected narrow-band active filters 1, 14 with different gain factors at their respective median frequency, with the gain factor of the filter 1, the median frequency of which is closer to the lower corner frequency of the useful frequency band, being greater than that of the filter 14, the median frequency of which lies closer to the upper corner frequency and, therefore, is smaller.

The first filter 1 has an operational amplifier 5, the non-inverting input of which is connected to the tap, maintained at positive potential, of a voltage divider consisting of resistors 2, 4 and fed with a constant voltage, to which in turn the signals received by the reception converter W2 can be fed through a coupling capacitor 3. For frequency compensation, the operational amplifier 5 is wired to a capacitor 11 and the series arrangement of a capacitor 12 and a resistor 13. In order to obtain the desired filter behavior, the feedback branch between the output of the operational amplifier 5 and the inverting input contains a T-element which comprises a resistor 10 wired between the output and the input, a series arrangement of two capacitors 8, 9 placed in parallel with the resistor 10, and a resistor 7 connected to the junction of the capacitors 8, 9 and grounded by its terminal remote from said junction. The resistor 10 substantially determines the gain factor, with the capacitors 8, 9 and the resistors 7 at the median frequency. The second filter 14 is constructed by the same circuit technique; the operational amplifier 15 is wired to a capacitor 23 and to the series arrangement of a capacitor 22 and a resistor 21, whereby the feedback branch between output and inverting input includes a T-element comprising resistor 20, series arrangement of two capacitors 18, 19, and a resistance 17 connected to their junction. Thus, the gain factor at the median frequency is obtained by a different choice of the resistance value of the resistor 20 from that of the resistor 10, and said differing median frequency is obtained by a different choice of the capacitors 18, 19 and of the resistor 17 from the capacitors 8, 9 and the resistor 7.

Figure 3:
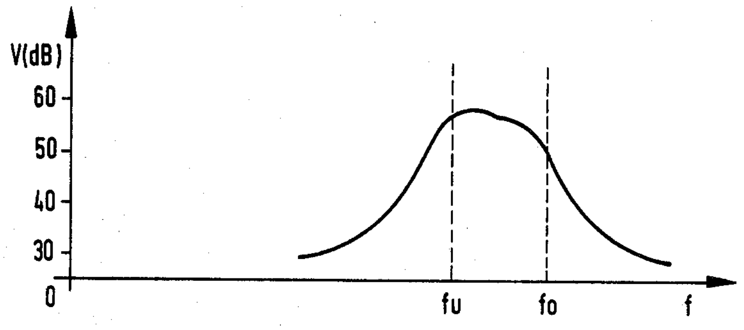
FIG. 3 shows the frequency curve of the receiver according to FIG. 2.

The frequency curve obtained by the construction of the amplifier V2 (FIG. 2) is illustrated in FIG. 3; it will be seen clearly that the gain factor V at the upper corner frequency fo of the useful frequency range, namely the group frequency of the transmitter S (FIG. 1) is lower than in all the rest of the useful frequency range, and is more particularly more than 3 dB lower than at the lower corner frequency fu, which coincides with the lowest frequency of the frequency signals corresponding to command signals which can be generated. The group frequencies fo are also amplified by at least 3 dB less than the frequency signals corresponding to command signals. In general, it has been found favorable if the difference of the gain factor between command signals of corresponding frequency signals on the one hand and group frequency signals on the other hand is between 3 dB and 6 dB.

Figure 4:
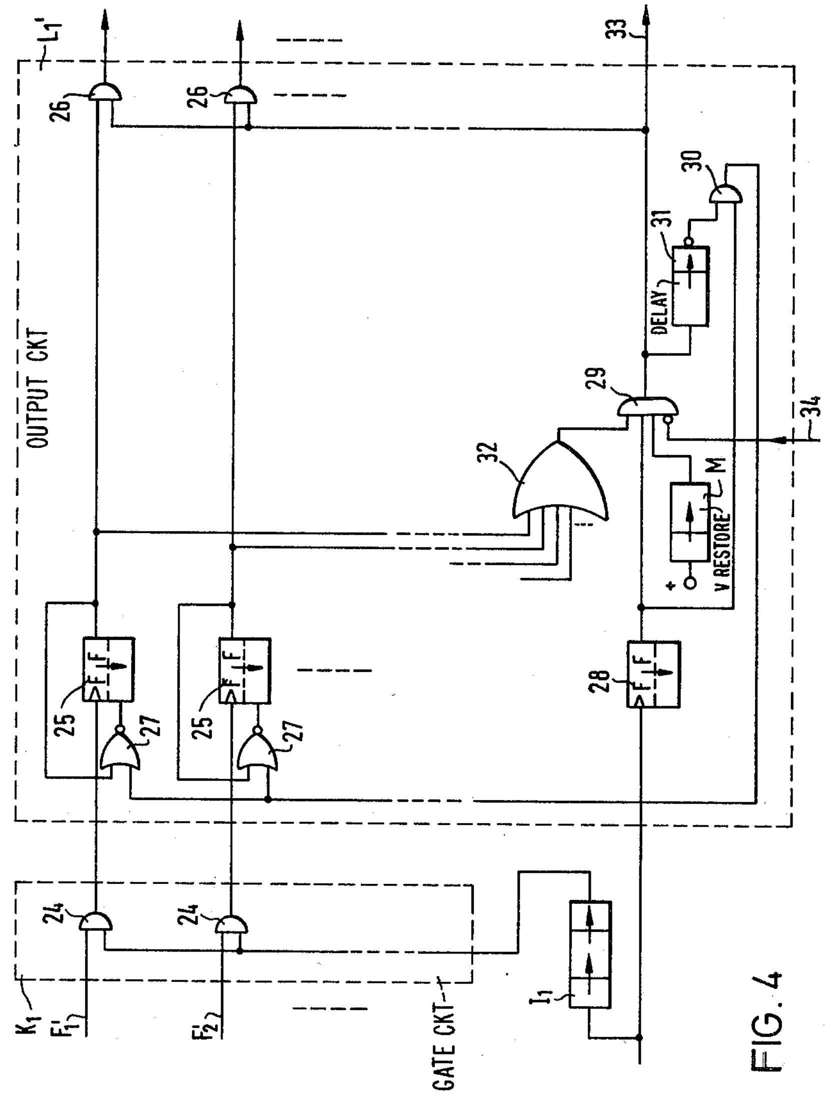
FIG. 4 shows, as a block circuit diagram, parts of the receiver of the arrangement according to FIG. 1.

FIG. 4 shows, as a simplified block circuit diagram of the output circuit L1' associated with the operating table T (FIG. 1), which here also additionally embraces the interlocking circuit N1 and the voltage restoration circuit M (FIG. 1), as well as the gate circuit K1 preceding it with associated time-signal transmitter I1. For the sake of simplicity, only two command signal channels have been shown, the inputs F1', F2' of which are connected to the outputs F1, F2 of the decoding circuit D (FIG. 1).

The inputs F1', F2', . . . are respectively constituted by the input of an AND-gate 24, and the second inputs of all the AND-gates 24 are connected to the output of the time-signal transmitter I1, which is represented here as a delayed-reaction and delayed-drop delay circuit. The reaction delay of the time-signal transmitter I1 after the leading edge (here assumed to be positive) of an indicator impulse delivered by the output G1 (FIG. 1) is at least as great as the duration of said indicator impulse, and the drop delay, which is likewise calculated from the leading edge of this indicator impulse, is no greater than the overall duration of an indicator impulse and of a command signal impulse immediately following the same. The reaction delay and the drop delay are conveniently longer and shorter respectively than these stated values. In this way, a time window is created, during that time following an indicator impulse in which a command signal impulse appears in the case of regular reception, and this is allowed to pass through one of the AND-gates 24 to one of the inputs of the output circuit L1'.

The output circuit L1' comprises a number of memories corresponding to the number of the command signal channels, in the form of retriggerable monostable flip-flops 25, in which the setting inputs (A-inputs) constituting the inputs of the output circuit L1' are impingable by the command signal impulses allowed to pass by the gate circuit K1. In this context, the flip-flop 25 is set by the leading edge (assumed to be positive) of the command signal impulse and generates a command signal at its output (Q-output) connected to an AND-gate 26 unless its erasure input is fed by an erasure signal. After a flip-flop 25 has been set, it flips back into the rest state after the expiration of a prescribed flip period, which is at least as long as the total duration of an indicator impulse and of a command signal impulse following the same, whereby the previously emitted command signal disappears. Each of the erasure inputs of the flip-flops 25 is preceded by a NOR-gate 27, which in the rest state receives no input signals and, therefore, emits an output signal as an erasure signal, so that all the flip-flops 25 are impinged by an erasure signal and cannot store command signal impulses.

The indicator impulses of output G1 (FIG. 1) feed in addition to the time-signal transmitter I1 an additional memory in the form of a further retriggerable flip-flop 28 provided in the output circuit L1'. Its flip period corresponds to that of the flip-flops 25. When the transmitter S (FIG. 1) is activated to transmit a command signal, it first of all, as explained hereinbefore, transmits a group frequency signal impulse, whereupon the decoding circuit D generates a corresponding indicator impulse, the leading edge of which sets the flip-flop 28. The latter's output signal impinges two AND-gates 29, 30. In the rest state, an input signal is fed from the output of a delay element 31 to the second output of the AND-gate 30, so that when the output signal of the flip-flop 28 appears it likewise emits an output signal. This output signal is fed to one input of each of all the NOR-gates 27, whereby the erasure signal previously fed to the erasure inputs of the flip-flops 25 is disconnected. The latter are, therefore, now ready to store a command signal impulse fed during the subsequent time window prescribed by the time-signal transmitter I1. By this means, a command signal is emitted by the said flip-flop 25 provided that no further command signal impulses are generated in the same command channel during the period of the transmission, because due to these command signal impulses, the flip time of the retriggerable flip-flop 25 recommences afresh each time. When the transmission of a command signal is completed, and if, accordingly, the flip-flop 25 of the relevant channel which was previously set is no longer fed by command signal impulses, then it flips back into the rest state after the expiration of the flip period after the leading edge of the last command signal impulse received.

The voltage restoration circuit M is represented in FIG. 4 as an exclusively reaction-delayed delay element impinged by the supply voltage. The output signal which it generates feeds a further input of the AND-gate 29, so that before the output signal of the voltage restoration circuit M is present, no service signal can be generated along the wire 33 and no command signal can be emitted. A further, inverting input of the AND-gate 29 is fed through a wire 34 by the output signal of the coincidence circuit P (FIG. 1), so that in the presence of this output signal the service signal is likewise inhibited and the emission of any command signal is interrupted.

The input of the exclusively drop-delayed delay element 31, which exhibits an inverting output, is fed by the service signal on the wire 33. Therefore, when the service signal appears, the output signal of the delay element 31 causes immediately and the output signal of the AND-gate 30 also disappears. Thus, the disconnection of the erasure signal fed to the flip-flops 25 which previously occurred is canceled and the erasure signal is once more fed to the flip-flops 25. However, this does not apply to the flip-flop 25 which is already set. In fact, the input which delivers the command signal for a set flip-flop 25 is connected to the respective second input of the NOR-gate 27, so that in the case of a command signal emitted by a flip-flop 25, the associated NOR-gate 27 receives an input signal in spite of the elimination of the output signal of the AND-gate 30 and generates no erasure signal. The setting of a flip-flop 25, therefore, causes an erasure signal to be fed immediately to the erasure inputs of all the other flip-flops 25 and it is impossible for them to store any command signal impulses incorrectly generated in another channel.

Figure 5:
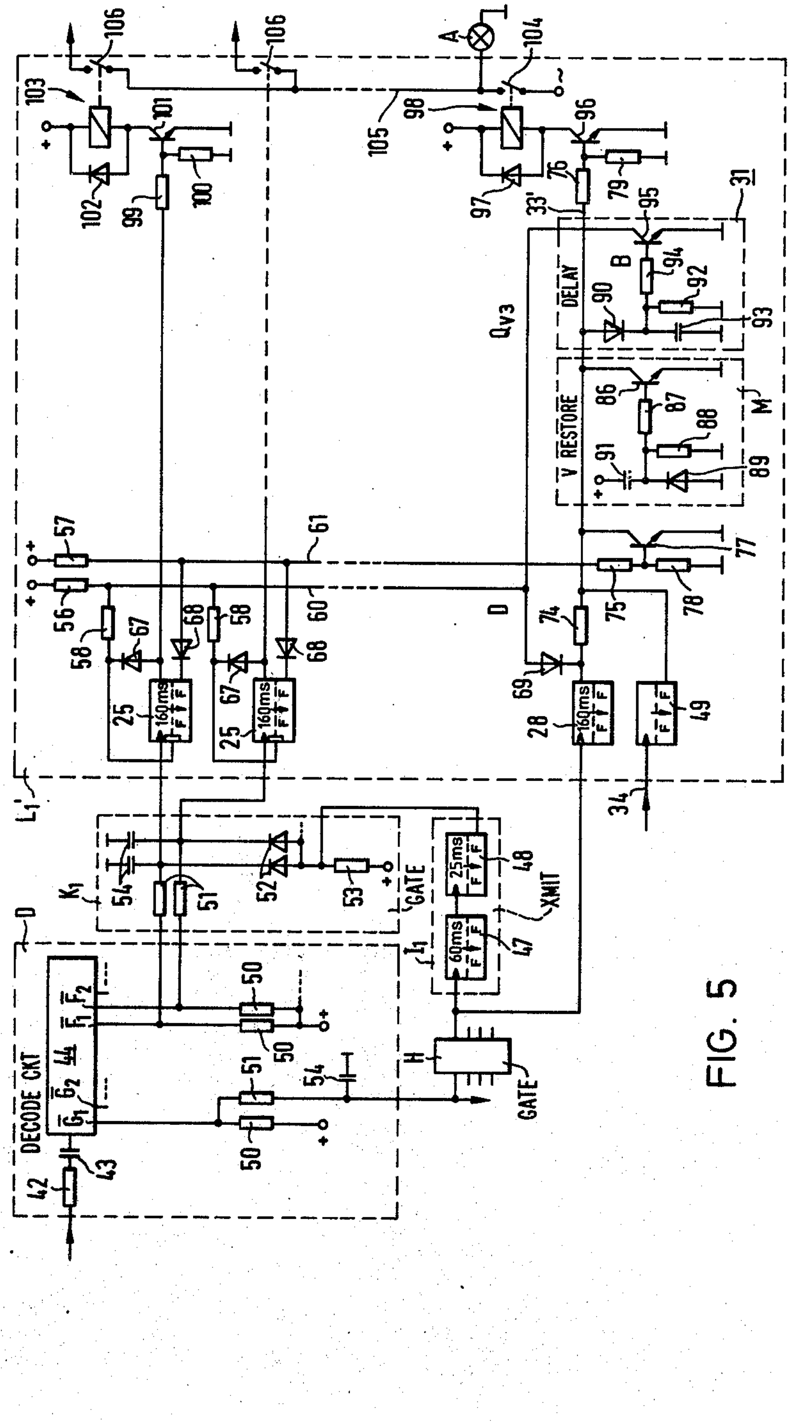
FIG. 5 shows further circuit details of parts of the receiver of the arrangement according to FIG. 1.

Those parts of the receiver already described in FIG. 4, and the decoding circuit D, are illustrated in greater technical detail in FIG. 5 for the case of using specific electronic components.

The decoding circuit D substantially includes a monolithically integrated receiver block 44, obtainable commercially under the designation TMS 3700 NS from Texas Instruments, the input of which is wired to the output of the amplifier V2 (FIG. 1) through a resistor 42 and a coupling capacitor 43. The block 44 executes the functions of the decoding circuit D described with reference to FIG. 4, but it generates the indicator impulses corresponding to the group frequency signal impulses and command signal impulses corresponding to the frequency signal impulses in such a way that the corresponding output is grounded, whereas in the state of rest, all the outputs of the block 44 are nonconductive. The outputs of the block 44 are, therefore, designated $\overline{G1}$, $\overline{G2}$, . . . and $\overline{F1}$, $\overline{F2}$, . . . In order that a definite potential prevails in them in the rest state, they are each connected through a resistor 50 to a positive potential constituting the level H. The emission of the indicator impulses and of the command signal impulses occurs in each case through a resistor 51, the terminal of which is remote from the respective output $\overline{G1}$, $\overline{G2}$, . . . or $\overline{F1}$, $\overline{F2}$, . . . is grounded through a blocking capacitor 54 as protection against interference voltage peaks.

The aforementioned resistors 51 connected to the outputs $\overline{F1}$, $\overline{F2}$, . . . of the block 44 simultaneously constitute a part of the gate circuit K1, the outputs of which, in the state of rest, are connected through a resistor 53 and each through a diode 52 to positive potential and hence to the level H. The junction of the resistor 53 and of the diodes 52 is connected to the output of the time-signal transmitter I1, which is constituted here by two flip-flops 47, 48. The time-signal transmitter I1 constituted by the two flip-flops 47, 48 is available commercially as a monolithically integrated block under the designation MC 14528 AL from Texas Instruments. The first flip-flop circuit 47 forms with its B input the input of the time-signal transmitter I1 and is settable by the leading edge (negative here) of an indicator impulse passed by the gate circuit H. Its flip time corresponds to the reaction delay of the time-signal transmitter I1. The output (Q output) which assumes the level H when the flip-flop 47 is set is connected to the input ($\overline{B}$ input) of the second flip-flop 48, the output of which ($\overline{Q}$ output) carries the level H in the unset state constituting the output of the time-signal transmitter I1. The flip time of the second flip-flop 48 corresponds to the duration of the desired time window, i.e., to the difference between the drop delay of the time-signal transmitter I1 calculated from the negative leading edge of the relevant indicator impulse and the flip time of the first flip-flop 47. While the second flip-flop 48 is in the flipped state, the output of the time-signal transmitter I1 is grounded (level L), whereby the feeding of the outputs of the gate circuit K1 with the level H through the diodes 52 is inhibited and any command signal impulses with the level H generated by the block 44 are allowed to pass by the gate circuit K1 to the inputs of the output circuit L'1.

The gate circuit H may be constructed in the same manner as the gate circuit K1.

The flip-flops 25, 28 and a further flip-flop 29, which is fed by the output signals of the coincidence circuit P (FIG. 1) which here exhibit the level L, are combined by pairs in a manner not shown to form integrated blocks of type MC 14528 AL, available from Texas Instruments. They are fed by the respective input signal at a B input and become set when the input signal exhibits a negative edge, i.e., changes from level H to level L. The flip-flops 25 further exhibit an erasure input (CD input) which prevents flipping when an erasure signal of level L is fed, or in the already flipped state effects immediate flipping back into the state of rest, while it is inoperative when fed with a signal of level H. Corresponding erasure inputs, not shown, are also present in the flip-flops 28, 47, 48, 49, but are permanently connected to the level H and are, therefore, inoperative. The Q outputs which emit a signal of level H in the set state of the flip-flops 25, 28, 49 are grounded in the state of rest, while, conversely, the $\overline{Q}$ outputs which emit a signal of level H in the state of rest are grounded in the set state.

Since in FIG. 5 the erasure signals of the flip-flops 25 are complementary to the case of FIG. 4, they only require, instead of the NOR-gates 27 (FIG. 4) an OR-gate each through which a signal cancelling the erasure signal is feedable to the erasure inputs. These OR-gates each include a resistor 58 and a diode 67 in FIG. 5; through the resistor 58, the respective erasure input can be fed with the level of a wire 60, while through the diode 67 wired between the Q output and the erasure input, the level H of a command signal which may be emitted by a flip-flop 25 is connectable to the respective erasure input even if the wire 60 should have the level L.

The AND-gate 30 (FIG. 4) is shown in FIG. 5 as a resistor 56 through which positive potential can be fed to the wire 60, by a diode 69 connected to the Q output of the flip-flop 28, and of the output transistor 95 of the delay element 31. So long as the flip-flop 28 is unset, its Q output is grounded (level L), whereby the wire 60 is also maintained at the level L through the diode 69. The transistor 95 is nonconductive in the state of rest, because its base is grounded through a resistor 94, and a resistor 92 connected in series therewith. When the flip-flop 28 is set by feeding it with an indicator impulse, its Q output assumes the level H, whereby the diode 69 is fed in the blocking direction, and due to the feeding of the positive potential through the resistor 56, the wire 60 can also assume the level H so long as the transistor 95 is nonconductive. This then causes the erasure inputs of the flip-flops 25 to be fed with the level H through the resistors 58, so that a flip-flop 25 can be set by a command signal impulse passed by the gate circuit K1.

The AND-gate 29 (FIG. 4) which generates the signal indicating the service of the receiver E (FIG. 1) when its AND-condition is fulfilled, is constituted in a technically highly simple manner in FIG. 5 by a resistor 74, the $\overline{Q}$ output of the flip-flop 29, a transistor 77 and the output transistor 86 of the voltage restoration circuit M. The resistor 74 is wired to the Q output of the flip-flop 28 and, therefore, transfers the level H which appears on it to a wire 33' if neither the $\overline{Q}$ output of the flip-flop 29 nor the transistor 77 nor again the transistor 86 is conductive. However, the transistor 77 is conductive in the state of rest because its base is wired to a voltage divider constituted by resistors 57, 75, 78 and connected between positive potential and ground and is thereby fed with a sufficiently high positive potential to make the transistor 77 conductive. Because the emitter of the transistor 77 is grounded, its collector connected to the wire 33' connects said wire 33' to level L. The same occurs when the flip-flop 49 is set by the output signal of the coincidence circuit P (FIG. 1). Only after the expiration of its flip time, which represents a multiple of the duration of a group frequency impulse, can the signal indicating service then be generated again, i.e., the wire fed to 3' assume the level H. In corresponding manner, the wire 33' is also maintained at the level L for a prescribed delay time by means of the voltage restoration circuit M after the supply voltage is switched on or after a voltage interruption.

The base of the transistor 86 of the voltage restoration circuit M is connected to the switched supply voltage through the series arrangement of a capacitor 91 and a resistor 86. When the supply voltage is switched on, the charging current of the capacitor 91 flows through a resistor 88 which is connected between the junction of the capacitor 91 and resistor 87 on the one hand and ground on the other hand, and the voltage drop at this charging resistor 88 is sufficient to make the transistor 86 conductive until, after a prescribed delay time, the capacitor 91 is sufficiently charged and the charging current has dropped sufficiently for the base of the transistor 86 to be once more approximately at ground potential. The delay time in this context is determined by the time constant obtained from the product of the resistance value of the charging resistor 88 and the capacidence of the capacitor 91. In the case of an even extremely brief interruption of the voltage supply, the capacitor 91 is discharged through a diode 89 connected in parallel with the charging resistor 88 and then impinged in the forward direction, whereby the transistor 86 is made conductive once more upon the subsequent voltage restoration.

Instead of the OR-gate 32 in FIG. 4, in FIG. 5, a NAND-gate connected to the $\overline{Q}$ outputs of the flip-flops 25 is provided, which comprises in addition to the voltage divider already mentioned with the resistors 57, 75, 78 and the transistor 77, diodes 86 which are connected by their cathodes to the $\overline{Q}$ outputs of the flip-flops 25, while their anodes are connected to the wire 61 connecting the resistors 57, 75. Said wire carries the level H in the state of rest, because with the flip-flops 25 unset, their Q outputs likewise carry the level H and impinge the diodes 86 with a low blocking voltage. On the other hand, when one of the flip-flops 25 is set, its output becomes grounded, whereby the diode 68 following it becomes conductive in the forward direction and also raises the wire 61 to the level L. This in turn causes blocking of the transistor 77, whereby if the remaining AND-conditions are satisfied, the level H can be generated on the wire 33' as a signal indicating service.

The above-described NAND-gate has the advantage over the OR-gate 32 in FIG. 4 that the Q output of a set flip-flop 25 is less loaded, which is in the interest of low power dissipation of all the flip-flops.

When the signal indicating service of the receiver is generated at a level H on the wire 33', this causes the base of the transistor 95 of the delay element 31 to be fed through the series arrangement of a diode 90 poled in the passage direction with respect to the level H and a resistor 94, whereby the transistor 95 becomes conductive virtually immediately. It then connects the wire 60 to ground so as to feed an erasure signal (level L) to the erasure inputs of the unset flip-flops 25 in the manner described. However, if after the end of the transfer of a command signal or for any other reason the signal indicating service disappears from the wire 33', i.e., the wire 33' assumes the level L, then the transistor 95 still remains conductive during a prescribed drop delay time in order to prevent the storage of further command signal impulses during a transfer pause corresponding to this drop delay time. For this purpose, there is wired between the junction of the diode 90 and of the resistor 94 on the one hand and earth on the other hand a capacitor 93 with which a high-ohmic discharge resistance 92 is wired in parallel. The capacitor 93 becomes charged very rapidly through the diode 90 when the level H appears on the wire 33', but can only discharge through the discharge resistor 92 when the level L is present on the wire 33', because the diode 90 is then poled in the blocking direction. The product of the resistance value of the discharge resistor 92 and capacitance of the capacitor 93, therefore, constitutes the time constant of the time element 31 which determines the drop delay time.

The signal on wire 33' indicating service of the receiver is amplified in FIG. 5 and is indicated by means of a glow lamp A. For amplification, the signal is fed through a resistor 76 to the base of a switching transistor 96, the main current path of which is connected in series with the coil of a relay 98 to the supply voltage, while the base is grounded through a resistor 79 in order to keep the transistor 96 nonconductive in the absence of an input signal. A flyback diode 97 is wired in parallel with the coil of the relay 98. The relay 98 has a make contact 104 which when actuated connects a wire 105 to an alternating voltage and switches on the lamp A.

The command signals which can be emitted by the flip-flop 25 in the set state are each likewise amplified for their emission, although this is shown only for the top channel in FIG. 5. For this purpose, the respective command signal impinges through a resistor 99 the base of a switching transistor 101 which is connected to ground through a further resistor 100, the main current path of which is connected to the supply voltage in series with the coil of a relay 103 wired to a flyback diode 102, whereby a make contact 106 connected to the wire 105 is actuated. The latter switches on the servo drive of the associated appliance corresponding to the particular function to be controlled, provided the contact 104 is also made and the series arrangement of the make contact 104 with each of the make contacts 106 fulfills the AND-condition of the output gate circuit constituted by AND-gates 26 in FIG. 4, according to which the command signal is emitted only if the signal indicating service of the receiver is also present.

Figure 6:
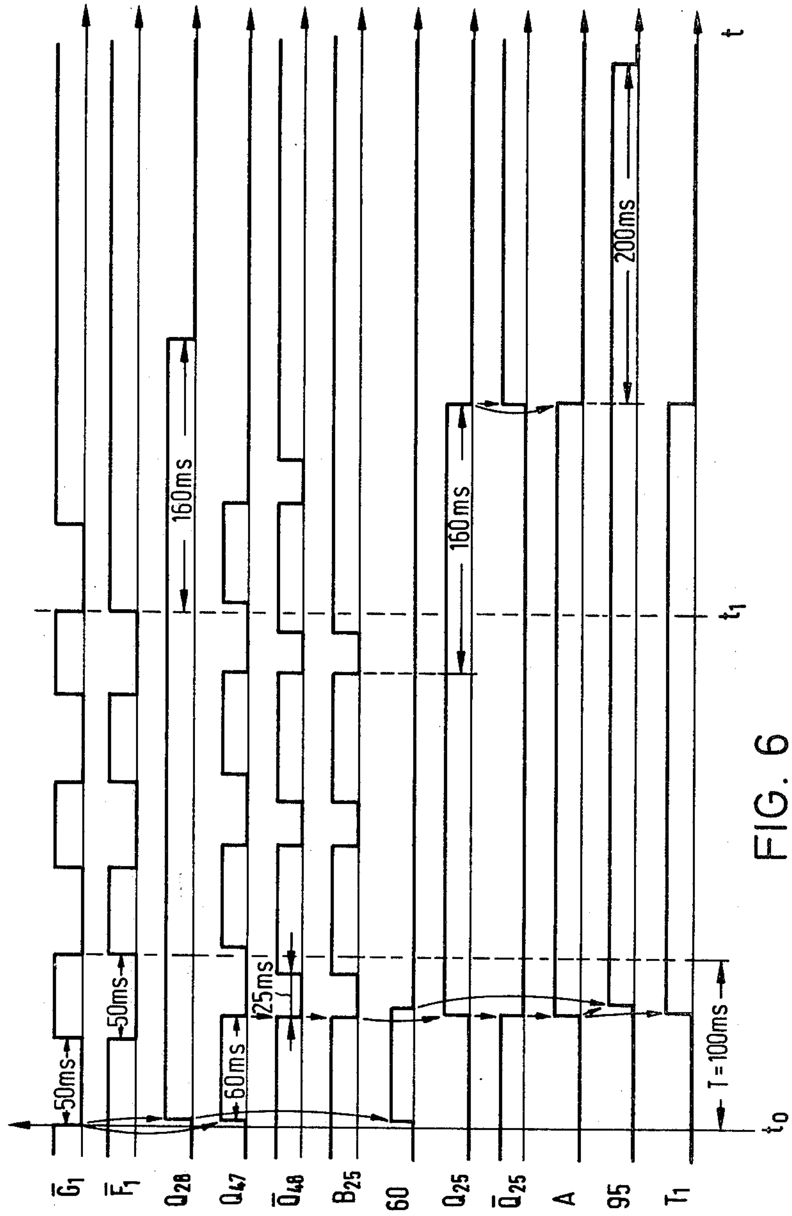
FIG. 6 shows an impulse diagram to explain the principal of operation of the receiver of the arrangement according to FIG. 1.

The principle of operation of the receiver E (FIG. 1) in the embodiment according to FIG. 5 will now be explained once more with reference to the impulse diagram of FIG. 6.

Here it is assumed that the receiver was switched on previously, so that the delay time of the voltage restoration circuit M has expired, and that the transmitter S transmits alternately group frequency impulses and frequency signal impulses which correspond to a prescribed command signal.

Indicator impulses of level L corresponding to the group frequency impulses received, which each last 50 ms and which alternate with command signal impulses of level L, which likewise last 50 ms each, appearing at output $\overline{F1}$, appear at the output $\overline{G1}$ which is at the level H in the state of rest; the respective signals are repeated with a cycle period TZ of 100 ms.

The negative leading edge of the first indicator impulse received at the time t0 sets the flip-flop 28 and the flip-flop 47 of the time-signal transmitter I1, causes their Q outputs to assume the level H; the corresponding signals are designated Q28 and Q47 respectively. The flip-flop 28 is triggered afresh by each of the indicator impulses, so that it generates the signal Q28 of level H throughout the entire transfer period. The flip-flop 47, however, flips back into the state of rest 60 ms after it is set, and thereby flips the second flip-flop 28 of the time-signal transmitter I1, causing its $\overline{Q}$ output to assume the level L for the period of 25 ms; this signal is designated $\overline{Q}$ 48. The flip-ping of the flip-flops 47, 48 occurs afresh during each cycle of indicator impulse and command signal impulse, whereby, in the manner already explained, the time window is prescribed during which the gate circuit K1 can pass a command signal impulse. Accordingly, the input B25 of a flip-flop 25 is impinged by an input signal of level L during the time window each time throughout the duration of transmission.

The signal of the wire 60 assumes the level H when the flip-flop 28 is set, because the Q output of the flip-flop 28 then no longer grounds the wire 60 through the diodes 69. This causes the erasure signal of all the flip-flops 25 to be disconnected, leaving them ready to store a command signal impulse. The first command signal impulse of level L fed to the input B25, therefore, causes the setting of flip-flop 25, whereby the signal Q25 assumes the level H at its Q output; the signal $\overline{Q}25$ of a complementary $\overline{Q}$ output falls to the level L. The signals Q 25, Q25 do not change during the duration of transmission, because the set flip-flop 25 is retriggered each time by the next command signals.

The level L of the signal $\overline{Q}25$ in FIG. 5, or the level H of the signal Q25 (command signal) in FIG. 4 permits the generation of the signal indicating service of the receiver and switches on the lamp A. It also permits the emission of the command signal to control the corresponding function of the associated appliance, the operating table T in the example. The command signal emitted is designated T1.

The switching state of the transistor 95 of the delayed-drop time element 31 is shown immediately above the emitted command signal T1. The transistor 95 is made conductive when the signal of the lamp A indicating service appears, whereby the wire 60 assumes the level L. All the flip-flops 25 apart from that which was set first are thereby blocked by a fresh impingement with the erasure signal.

The last command signal impulse ends at the time t1—i.e., the transmission of the command signal was completed. The set flip-flop 25, therefore, flips back into the state of rest after the expiration of the flip time of 160 ms after the leading edge of the last input impulse at the input B25, even if a further group frequency impulse is emitted and a further indicator signal is, therefore, generated at the output $\overline{G}1$. Consequently, the signal indicated by the lamp A reassumes the level L, which also prevents the further emission of the command signal.

Due to the delayed drop of the time element 31, its transistor 95 reverts to the nonconductive state only after the drop delay time of 200 ms. Until then, no further storage of command impulses in the output circuit L1' is possible. Then, in the meantime, the flip-flop 28 has also reverted to its state of rest; this flip back occurs 160 ms after the leading edge of the last indicator impulse generated.

The embodiment of the method and of the remote control arrangement described with reference to FIGS. 1 and 4 to 6 is also advantageously useful independently of the fact that, according to FIGS. 2 and 3, the group frequency impulses are amplified less than the frequency signal impulses corresponding to the command signals, because even then a considerable improvement in freedom from interference is achieved by the mutual interlocking of the retriggerable flip-flops 25, by the action of the voltage restoration circuit M and/or by the action of the delayed-drop time element 31.

The methods described and the remote control arrangement described are suitable for any desired medical appliances, more particularly, in hospitals. In addition to the control of operating tables and bed-changing devices as indicated in FIG. 1, the method and the remote control arrangement are also particularly suitable for controlling patient lift devices in medical baths, where a patient carried in a seat suspended from an overhead travelling crane is lifted from the edge of the basin by said overhead travelling crane, transported over the bath basin, lowered into the bath basin and set in motion in the basin. An important advantage in this case lies in the fact that the bath attendant or doctor attending the patient can control the required functions in a simple manner while he remains at the edge of the basin or even, if the transmitter is of waterproof construction, remains in the water of the basin in immediate proximity of the patient. Furthermore, this mode of control which is novel in the case of such patient lift devices provides the possibility of providing additional functions. Thus, e.g., a device may be provided in the suspension of a patient's seat of the overhead travelling crane which makes it possible to rotate the seat with reference to the direction of travel of the crane, so as to be able while the seat is transported along overhead to be able to spray the patient with water pressure which occurs during the transport from different directions in order to strengthen different muscle parts according to the direction of the seat.

The remote control arrangement according to the invention is also advantageously useful in other applications than the control of of medical appliances, more particularly in cases where powerful interference sources have to be taken into account.

What is claimed is:

1. A method for remotely controlling a medical appliance by means of a transmitter and receiver comprising the steps of:

assigning a number of first frequency signals of differing frequencies corresponding to the number of functions of the appliance to be controlled to a transmitter for selectively generating each of said number of first frequency signals as command frequency signal impulses and to a receiver, assigned to at least one such appliance to be controlled, for receiving said command frequency signal impulses;

defining a second frequency signal to designate a selected appliance to be controlled to a transmitter for selectively generating said second frequency signal as group frequency signal impulses and to a receiver assigned to at least said selected appliance to be controlled, for receiving said group frequency signal impulses;

transmitting group frequency signal impulses and selected command frequency signal impulses in an alternating sequence in response to a function chosen to be controlled for a selected appliance, said selected command frequency impulses corresponding to one of said number of first frequency signals of said differing frequencies for said function chosen;

receiving said group frequency signal impulses and said selected command frequency signal impulses;

selectively amplifying said received group frequency signal impulses and said selected command frequency signal impulses to apply at least 3 db more gain to said selected command frequency signal impulses than to said received group frequency signal impulses;

decoding said received group frequency signal impulses and generating indicator pulses enabling access to said selected appliance to be controlled if said selected appliance is assigned to said receiver;

decoding said received, selected command frequency signal impulses and applying a signal representing said function chosen to an enabled, selected appliance to be controlled to perform said function chosen; and inhibiting a generation of indicator pulses whenever group frequency signal impulses defining more than one selected appliance are simultaneously received and have the same magnitude.

2. The method according to claim 1 wherein the step of selectively amplifying said received group frequency signal impulses takes place prior to generating said indicator pulses.

3. The method according to claim 1 comprising the additional step of storing decoded, selected command frequency signal impulses for at least the duration of said indicator pulses, said storage of said decoded, selected command frequency signal impulses inhibiting storage of other command frequency signal impulses.

4. The method according to claim 3 additionally comprising the step of inhibiting storage of decoded, command frequency signal impulses for a predetermined interval.

5. A method for remotely controlling an appliance by means of a transmitter and receiver comprising the steps of:

transmitting a signal composed of at least first and second frequencies in an alternating sequence, said first frequency defining a function to be performed by said appliance and said second frequency uniquely defining an appliance to be controlled;

receiving said signal composed of at least first and second frequencies in an alternating sequence;

selectively amplifying said received first and second frequencies to first and second levels, respectively, said first level being at least 3 db higher than said second level;

enabling an appliance uniquely defined by said second frequency; and applying a signal corresponding to the function to be performed as defined by said first frequency to said enabled appliance.

6. A remote control arrangement for controlling a medical appliance, comprising a transmitter, a receiver associated with at least one appliance, said transmitter comprising a generator for generating frequency signals of different frequencies as a function of a command signal, said transmitter having means for generating a command signal as a sequence of frequency signal impulses and for the generation alternately therewith of group frequency impulses of group frequencies different from all the frequency signals corresponding to command signals which can be generated, said receiver having at its input an amplifier selective for the frequencies of the frequency signal impulses corresponding to the command signals and of the group frequency impulses and a decoding circuit following said amplifier which, when supplied with frequency signal impulses emits command signal impulses to an output corresponding to the number of the frequency signals which can be generated, said amplifier further operating when fed by the group frequency impulses to emit indicator impulses indicating the reception of said group frequency impulses to a further output and which when fed simultaneously with two signals of different frequency and approximately equal amplitude generates no output signals, and said receiver having means to emit the command signal corresponding to the respective command signal impulses as a function of the presence of the indicator impulses, said amplifier of said receiver having at the group frequency a gain factor lower at least by 3 dB than at the frequencies of the frequency signal impulses corresponding to command signals.

7. A remote control arrangement according to claim 6, wherein said amplifier of said receiver has an active band pass which is preferably constituted by two active filters connected in series.

8. A remote control arrangement according to claim 7, wherein said filters each comprise an operational amplifier and a T-element placed in its feedback branch.

9. A remote control arrangement according to claim 8, wherein said T-element comprises a resistor placed between the output and the input of the operational amplifier, a series arrangement of two capacitors placed in parallel with the resistor, and a resistor connected to the junction of the capacitors having its terminal remote from said junction connected to a fixed potential.

10. A remote control arrangement according to claim 6, wherein the output of the decoding circuit provided for the emission of command signal impulses are followed through a gate circuit by a number of memories corresponding to the number of the outputs, a time-signal transmitter fed by the indicator impulses to make the gate circuit conductive for a prescribed time not longer than the duration of a command signal after the appearance of an indicator impulse, the command signal emitted by a memory in the set state preventing the setting of all the other memories, and a set memory being erasable after a prescribed storage period in the absence of fresh supplying by a command signal impulse.

11. A remote control arrangement according to claim 10, wherein the memories fed by the command signal impulses are retriggerable monostable flip-flops.

12. A remote control arrangement according to claim 11, wherein the flip-flops each exhibit an erasure input fed by an erasure signal in the state of rest, the erasure signal of all the flip-flops being disconnectable as a function of the appearance of an indicator impulse, said disconnection of the erasure signal of all the flip-flops being cancellable as a function of the command signal emittable by a set flip-flop, and the erasure signal of each flip-flop being additionally disconnectable as a function of the command signal emittable by the same flip-flop in the set state.

13. A remote control arrangement according to claim 10, wherein an additional memory fed by the indicator impulses to generate each output signal to disconnect the erasure signals of all the flip-flops is fed by command signal impulses, said last mentioned output signal also indicating the operation of the receiver, by controlling an optical indicator device.

14. A remote control arrangement according to claim 13, wherein said receiver is provided with a voltage restoration circuit, the output circuit of which prevents the emission of a command signal during a prescribed period after a switching-on or after the restoration of the supply voltage of the receiver following a brief interruption of the supply voltage.

15. A remote control arrangement according to claim 14, wherein said signal indicating operation is generated as a function of the output signal of the voltage restoration circuit.

16. A remote control arrangement according to claim 15, wherein a signal cancelling the disconnection of the erasure signals is generated by means of a delay-drop delay element fed by the signal indicating the operation of the receiver, the delay drop of said delay element being at least as great as the total duration of an indicator impulse and of a subsequent command signals impulse.

17. A remote control arrangement according to claim 16, wherein the emission of the command signals emittable by the flip-flops to the associated appliance simultaneously functions to cause the signal indicating the operation of the receiver, and to operate a switch means controlling a power supply to the appliance operation flow.

18. A remote control arrangement according to claim 6 for a plurality of medical appliances each with an associated transmitter and a common receiver, wherein the prescribed group of frequencies of the transmitters are mutually different, said receiver feeding the command signal obtained from the frequency signal impulses associated with a particular appliance's frequency of the group of frequency signals, and the receiver having a circuit which prevents the emission of command signals in the case of at least approximately simultaneous reception of at least two group frequency impulses of different group frequency.

* * * * *